June 1, 1954
T. H. KUMMER
2,679,859
FLOAT VALVE
Filed April 25, 1952
2 Sheets-Sheet 1
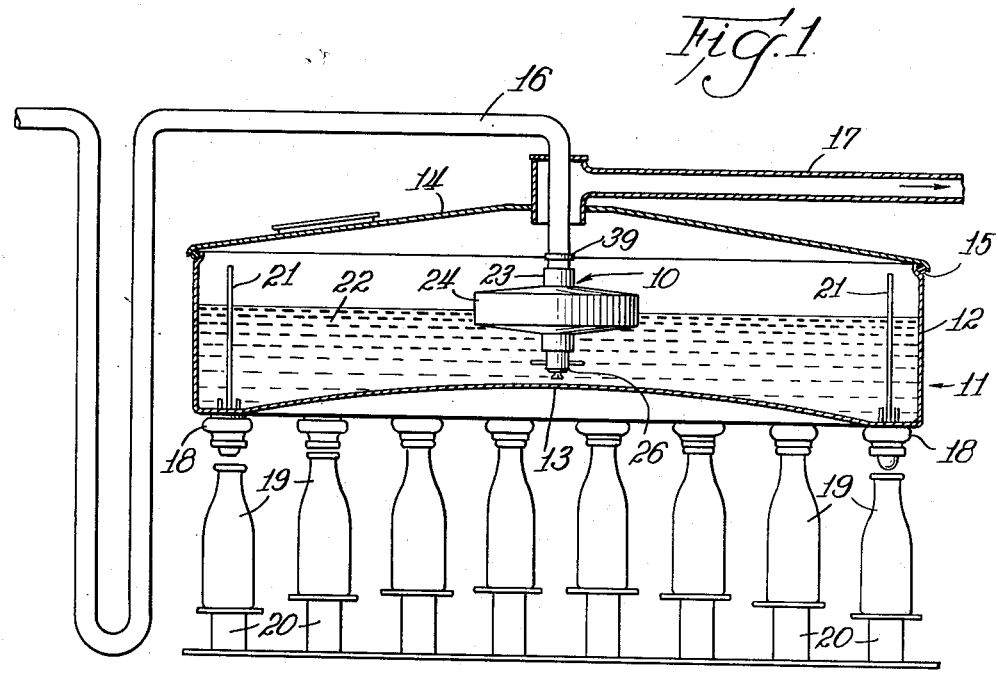
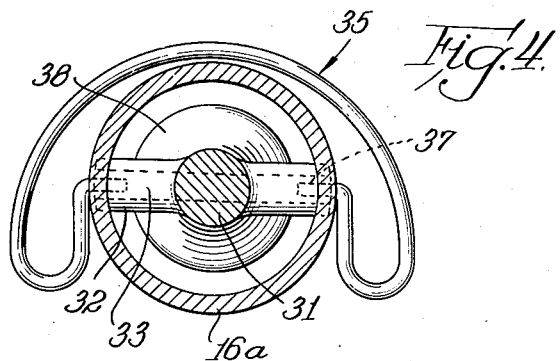
INVENTOR.
Theodore H. Kummer
BY
E. Manning Giles
Atty.

June 1, 1954 — T. H. KUMMER — 2,679,859
FLOAT VALVE
Filed April 25, 1952 — 2 Sheets-Sheet 2

INVENTOR.
Theodore H. Kummer
BY
E. Manning Giles
Atty

Patented June 1, 1954

2,679,859

UNITED STATES PATENT OFFICE 2,679,859

FLOAT VALVE

Theodore H. Kummer, Waukesha, Wis., assignor to Cherry-Burrell Corporation, Chicago, Ill., a corporation of Delaware Application April 25, 1952, Serial No. 284,267

5 Claims. (Cl. 137—432)

My invention relates to a float valve and has reference more particularly to an inlet valve through which a liquid food product such as milk is introduced into the supply tank of a receptacle filler.

Valves of this type are usually operated by means of a float which rises and falls with the level of the liquid in the supply tank to control the inflow of liquid. Thus when the liquid level goes down, the float lowers and thereby opens the valve to permit liquid to enter the tank. As the liquid level rises, the float is raised thereby to close the valve and shut off the flow of liquid.

In the handling of food products, the highest sanitary standards must be maintained and therefore valves of the type to which my invention relates are regularly disassembled after each use for inspection and thorough cleaning. Such valves must therefore be constructed to facilitate convenient disassembly, cleaning and reassembly, and to withstand the wear entailed in frequent dismantlings. Moreover, such valves should be designed to subject the food product flowing therethrough to a minimum of agitation so as to avoid formation of foam and incorporation of air in the product.

The principal objects of my invention are to provide a float valve through which liquid food product may be introduced into a supply tank near the bottom thereof and distributed radially outwardly around said valve to minimize the agitation of the liquid as it enters the supply tank; to design such a valve having a minimum of parts and of such simple construction that it can be taken apart, cleaned and reassembled in the shortest possible time; to insure the utmost accessibility of the product-contacting surfaces of said valve for cleaning and to enable direct view of interior surfaces for inspection; to provide ample flow space when the valve is open so that the velocity of product flow is relatively low in proportion to the amount of product passing through the valve so as to create a minimum of disturbance in the product as it passes therethrough; to discharge the product radially outwardly from the valve orifice; and to furnish such a valve which is adaptable to a wide variety of receptacle filling equipment, which will withstand abuse, and which will give long and dependable service, these and other objects being accomplished as hereinafter described, reference being had to the accompanying drawing in which Fig. 1 is a side view partly in section showing a receptacle filling device with a float valve embodying my invention incorporated therein;

Fig. 4 is a sectional view on the line 4—4 of Fig. 3.

Figure 2:
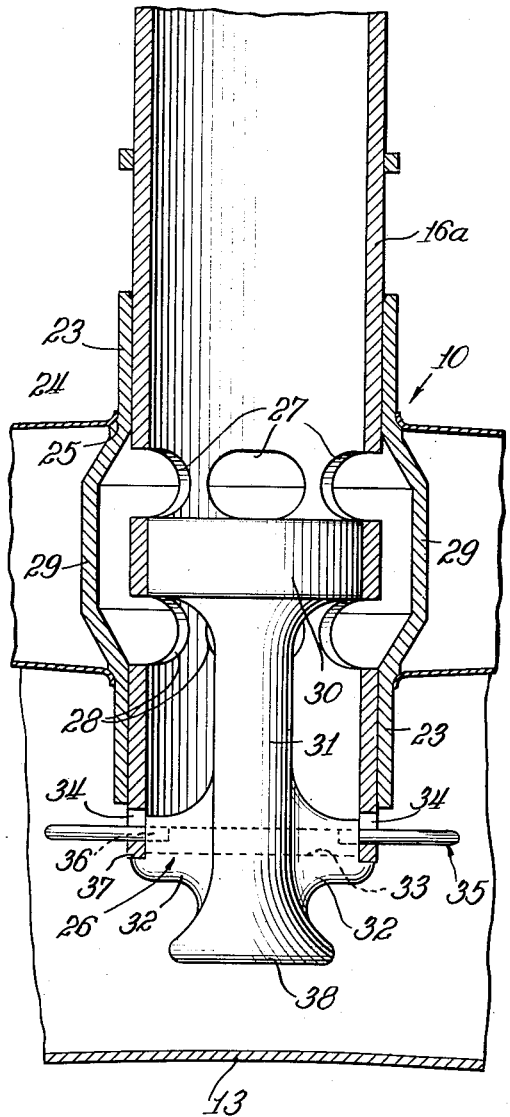
Fig. 2 is an enlarged sectional view showing the float valve of Fig. 1 in the open position.

Referring now to the drawing, the float valve embodying my invention is designated generally by the reference numeral 10, and is shown in Fig. 1 as used in a milk bottle filler 11. The milk bottle filler 11 shown in Fig. 1 is of the vacuum feed type, although it is to be understood that my float valve 10 is equally adaptable for use with other types of fillers such as those of the gravity type.

The milk bottle filler 11 consists of a supply tank 12 having a somewhat upwardly crowned bottom 13, and having a cover 14 with an airtight sealing gasket 15 interposed peripherally therebetween, as shown in Fig. 1. The milk is supplied to the supply tank 12 through a duct 16 and the air is evacuated from said supply tank 12 through a vacuum line 17.

The supply tank 12 is provided annularly around the bottom 13 with spaced filler valves 18 through which milk is introduced into receptacles, such as milk bottles 19, as the latter are raised by individual supports 20 into operating engagement with said filler valves 18.

In vacuum type fillers of the type shown in Fig. 1, each filler valve 18 is provided with a vertical vent tube 21 through which air is evacuated from the milk bottle 19 into the air space within the supply tank 12 above the level of the liquid milk 22.

Figure 3:
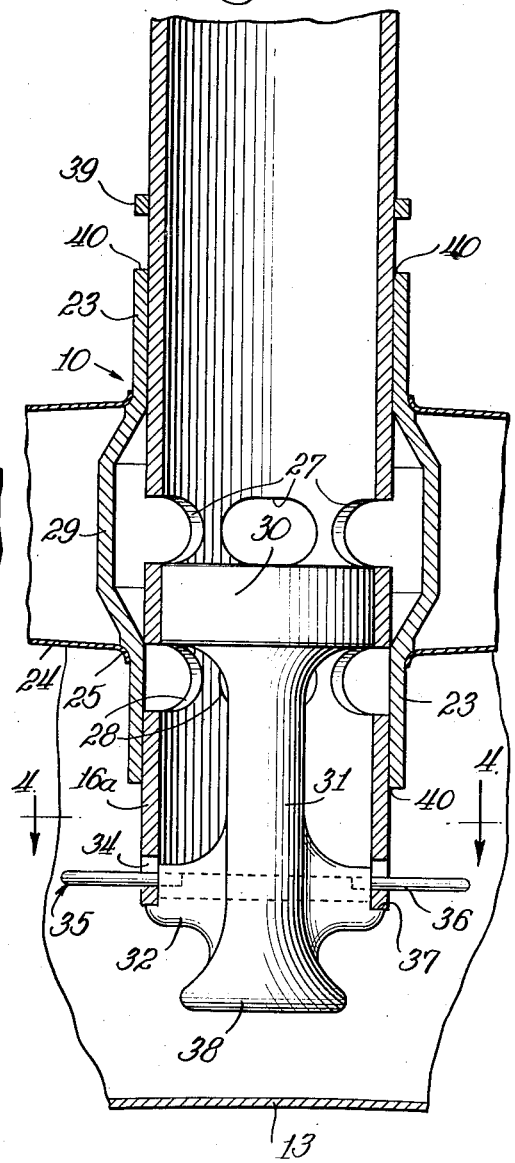
Fig. 3 is a view corresponding to Fig. 2, but showing the float valve in the closed position.

My float valve 10 consists of a sleeve 23 slidably engaged on the milk inlet tube 16a at the discharge end of the duct 16 and is provided with an annular float 24 circumferentially engaged in airtight relation on said sleeve 23 by welding 25 as shown in Figs. 2 and 3 or in any other manner.

The milk inlet tube 16a has a discharge orifice 26 at the lower end thereof and is provided with two sets of radial ports 27 and 28 near said orifice 26. The upper ports 27 and lower ports 28 are spaced apart sufficiently to provide therebetween an imperforate circumferential wall of the inlet tube 16a.

The sleeve 23 is provided with a circumferential bypass enlargement 29 substantially midway between its respective ends, the enlargement 29 being of substantially the same width as that of the ported area of the inlet tube 16a.

The respective ends of the sleeve 23 are adapted to bear on the inlet tube 16a and to slide thereon, the clearance therebetween being sufficient to permit free movement of the sleeve 23 on the tube 16a but close enough to restrict leakage of milk. In the case of liquid milk I have found a clearance of .004 of an inch to be advantageous although it will of course be understood that with more viscous liquids, a somewhat increased clearance would be necessary to permit free movement of the sleeve 23 on the tube 16a.

A circular plug 30 with a depending stem 31 is provided for insertion through the orifice 26 into the interior of the tube 16a. I have found that the plug 30 may be inserted conveniently in the tube 16a and yet will effectively restrict the passage of milk therebeyond when it has a diameter of approximately .004 of an inch less than the inside diameter of said tube 16a.

The plug 30 is inserted to a position in the tube 16a between the upper ports 27 and the lower ports 28, with the stem 31 extending downwardly toward the orifice 26. The lower end of the stem 31 is provided with diametrically opposed wings 32 with a diametric bore 33 therethrough. Diametrically opposed holes 34 are provided in the tube 16a adjacent the orifice 26. A semicircular spring clip 35 may be employed to retain the plug 30 in the tube 16a, the inturned ends 36 of said clip 35 being inserted through the holes 34 into the respective ends of the bore 33 in the wings 32 when said bore 33 and holes 34 are in matching alignment. The wings 32 may be notched to provide seats 37 to bear against the orifice 26 so as to stabilize the positioning of the plug 30 and assure insertion thereof to the desired depth in the tube 16a.

Preferably the stem 31 has an outwardly flared head 38 beyond the end of the tube 16a so that liquid flowing through the orifice 26 thereof will be discharged radially outwardly therefrom. This radial discharge pattern is preferred because of the positioning of the float valve 10 just above the bottom 13 of the tank 12 and it is desirable to avoid a perpendicular discharge from the orifice 26 which would produce undue agitation and disturbance of the liquid with resultant incorporation of air therein and formation of foam.

An external ring 39 or other abutment is provided on the tube 16a at a predetermined height above the orifice to limit the upward movement of the float valve 10. The ring 39 which may be welded in position should be located so that when the float valve 10 is raised into engagement therewith, the lower ports 28 are closed by the lower end of the sleeve 23 and communication is thus prevented between the bypass enlargement 29 and said lower ports 28 as shown in Fig. 3.

The spring clip 35 serves the purpose of supporting the float valve 10 on the tube 16a in the open position as shown in Fig. 2. Thus when the lower end of the sleeve 23 bears against the clip 35, the enlargement 29 encompasses the upper ports 27 and lower ports 28 providing an annular bypass therebetween externally of the tube 16a—internal flow of liquid through the tube 16a being prevented at that point by the interposition of the plug 30 therein between the upper ports 27 and the lower ports 28.

Preferably the components of the float valve assembly including the tube 16a, the sleeve 23, the float 24, the plug 30 and the clip 35 are fabricated of stainless steel owing to the superiority of that material in providing sanitary, readily cleanable, wear resistant surfaces for contact with liquid food products such as milk. It is to be understood, however, that any suitable materials may be employed in the construction of float valves embodying my invention. The respective parts must, of course, be accurately machined to insure against binding of plug 30 within the tube 16a and to assure free sliding movement of the sleeve 23 thereon. The securing of the float 24 to the sleeve 23 imparts reinforcement against distortion to the sleeve 23. Moreover, float valve 10 is symmetrical in each direction from the center thereof so that either end of the sleeve 23 may be placed upwardly on the tube 16a. The leading internal edges of the sleeve 23 may be chamfered as shown at 40 to facilitate assembly of the float valve 10 on the tube 16a, and other edges may be chamfered similarly as desired.

In operation, when the supply tank 12 is empty, the float valve 10 is supported by the spring clip 35 at a level just below that shown in Fig. 2 so that a bypass is provided around the plug 30 from the interior of the tube 16a through the upper ports 27 into the circumferential enlargement 29 of the sleeve 23 and back through the lower ports 28 into the discharge end of the tube 16a. As the milk or other liquid 22 is introduced through the duct 16 into the supply tank 12 and the level of the liquid therein rises, the buoyancy of the float 24 causes the sleeve 23 to rise on the tube 16a, and the float valve 10 is raised to the position shown in Fig. 3 at which level the lower end of the sleeve 23 seals off the lower ports 28 so as to prevent the milk in said tube 16a from bypassing the plug 30. Thus it will be understood that when the float valve 10 is raised to the closed position shown in Fig. 3 the flow of milk into the supply tank 12 is shut off until the milk level is lowered by the discharge of the milk through the filler valves 18 into the milk bottles 19, thus causing the float valve 10 to lower sufficiently to again permit the milk to bypass the plug 30 from the upper ports 27 through the circumferential bypass enlargement 29 into the lower ports 28 and out through the orifice 26.

In order to disassemble the float valve 10 for cleaning, the ends 36 of the spring clip 35 are sprung outwardly to move them from engagement with the bore 33 and the holes 34, thus enabling removal of the plug 30 from the interior of the tube 16a and removal of the float valve 10 from the exterior thereof. All surfaces of the plug 30, the stem 31, the sleeve 23, the float 24, and the tube 16a may then be inspected and cleaned and the reassembly thereof is accomplished quite simply by replacing the float valve 10 on the tube 16a, re-inserting the plug 30 in said tube 16a, and replacing the spring clip 35 to hold said plug 30 in place.

While I have shown and described my invention in a preferred form, it will be understood that various modifications can be made therein without departing from the spirit of my invention, the scope of which is to be determined by the appended claims.

I claim:

1. In a valve, the combination with a substantially vertically disposed supply duct having an opening in the lower end thereof of a sleeve slidably engaged on said duct adjacent the lower end thereof, a float secured to said sleeve, and a plug in said duct adjacent the lower end thereof, said duct being provided with a plurality of ports spaced apart longitudinally, said plug being normally positioned within said duct between the respective ports so as to substantially restrict liquid communication through said duct from one side of said plug to the other, and said sleeve having an imperforate external enlargement providing within said enlargement a liquid passageway having a longitudinal length greater than the longitudinal distance between the respective ports thereby affording a bypass around said plug when the sleeve is moved into a position to afford communication between said passageway and the respective ports.

2. A valve of the class described comprising the combination of a relatively elongated substantially cylindrical duct having an opening at one end thereof and having two openings in the side wall thereof spaced longitudinally apart, a substantially cylindrical sleeve member of reduced length with respect to said duct and slidably engageable thereon, said sleeve having lengthwise thereof an outward imperforate distortion in the wall of said sleeve, said distortion extending lengthwise of said sleeve a distance greater than the distance between said two spaced openings in the side wall of the cylindrical duct, a float secured externally to said sleeve, and a plug interposable within said duct between said two spaced openings.

3. A valve of the class described comprising the combination of a relatively elongated substantially cylindrical duct having an opening at one end thereof and having two openings in the side wall thereof spaced longitudinally apart, a substantially cylindrical sleeve member of reduced length with respect to said duct and slidably engageable thereon, said sleeve having lengthwise thereof an outward distortion in the wall of said sleeve, said distortion extending lengthwise of said sleeve a distance greater than the distance between said two spaced openings in the side wall of the cylindrical duct, a float secured externally to said sleeve, and a plug interposable within said duct between said two spaced openings, said plug having a downwardly depending stem-like portion with a radial enlargement at the lower end thereof adapted to impart a radially outward direction to liquid flowing from said duct.

4. In a float operated valve, the combination of an elongated body having a passageway therethrough, an opening at one end of said body leading into said passageway, a partition in said passageway spaced inwardly from said opening, a port in said body providing communication from the exterior thereof into the passageway at one side of said partition, a corresponding port in said body communicating with the passageway at the other side of said partition, a sleeve member slidably engaged for lengthwise reciprocation on said body, and a float secured to said sleeve, said sleeve member having an imperforate outwardly bulged portion at one side thereof adapted to cooperate with said ports and to provide a bypass therebetween from one side of the partition in said passageway to the other.

5. In a valve of the class described, the combination of a shank having a passageway therethrough, a pair of ports in said shank spaced longitudinally apart and communicating with the passageway therein, a sleeve engaged in lengthwise slidable relation on said shank, a float secured to said sleeve, a plug insertable in said passageway, and means for holding said plug at a predetermined position therein, said sleeve having a longitudinally disposed external bulge therein adapted when moved to a selected location to provide communication between said respective ports externally of said shank through said bulge, and said plug having a depending stem adapted to extend outwardly from said passageway when the plug is engaged therein, said means being adapted to cooperate with said depending stem to hold the plug at a position in the passageway between the respective ports, and said stem having an enlargement at the end thereof remote from said plug adapted to deflect liquid flowing therepast outwardly therefrom.

References Cited in the file of this patent

UNITED STATES PATENTS

| Number | Name | Date |
|---|---|---|
| 747,514 | Tozier | Dec. 22, 1903 |
| 1,121,622 | Hall | Dec. 22, 1914 |
| 1,522,982 | Strandt | Jan. 13, 1925 |
| 1,734,586 | Larsen | Nov. 5, 1929 |
| 2,106,340 | Conover | Jan. 25, 1938 |
| 2,116,505 | Burton | May 10, 1938 |
| 2,122,866 | Lippold | July 5, 1938 |
| 2,257,839 | Dixon | Oct. 7, 1941 |